(12) United States Patent
Bergström et al.

(10) Patent No.: US 11,209,089 B2
(45) Date of Patent: Dec. 28, 2021

(54) VALVE SEALING ARRANGEMENT AND A VALVE SEAT

(71) Applicant: NELES FINLAND OY, Vantaa (FI)

(72) Inventors: Tommi Bergström, Vantaa (FI); Pietari Skott, Vantaa (FI); Antti Kuitunen, Vantaa (FI)

(73) Assignee: NELES FINLAND OY, Vantaa (FI)

( * ) Notice: Subject to any disclaimer, the term of this patent is extended or adjusted under 35 U.S.C. 154(b) by 0 days.

(21) Appl. No.: 17/052,014

(22) PCT Filed: May 3, 2018

(86) PCT No.: PCT/FI2018/050325
§ 371 (c)(1),
(2) Date: Oct. 30, 2020

(87) PCT Pub. No.: WO2019/211506
PCT Pub. Date: Nov. 7, 2019

(65) Prior Publication Data
US 2021/0190217 A1  Jun. 24, 2021

(51) Int. Cl.
*F16K 5/20* (2006.01)
*F16K 5/06* (2006.01)

(52) U.S. Cl.
CPC ............ *F16K 5/207* (2013.01); *F16K 5/0668* (2013.01); *F16K 5/0689* (2013.01); *F16K 5/20* (2013.01)

(58) Field of Classification Search
CPC .......... F16K 5/207; F16K 5/205; F16K 5/201; F16K 5/20; F16K 5/0689; F16K 5/0668; F16K 5/0663; F16J 15/36; F16J 15/3472
See application file for complete search history.

(56) References Cited

U.S. PATENT DOCUMENTS 2,777,664 A  *  1/1957  Bryant .................. F16K 3/0236
                                                    251/174
4,217,923 A  *  8/1980  Kindersley ........... F16K 5/0636
                                                    137/315.21
(Continued)

FOREIGN PATENT DOCUMENTS

CN           2337366 Y      9/1999
CN         106885007 A      6/2017
(Continued)

OTHER PUBLICATIONS

Mar. 26, 2021 Extended Search Report issued in European Patent Application No. 18917047.5.
(Continued)

*Primary Examiner* — David Colon-Morales
(74) *Attorney, Agent, or Firm* — Oliff PLC

(57) ABSTRACT

A valve sealing arrangement, including a valve body, and a closing member including a closing member contact surface, and a seat, having a center axis, and provided with a sealing portion with a first sealing surface for making contact with the closing member and a back sealing portion with a second sealing surface for making contact with a surface of the valve body. The seat also includes a bellows between the first sealing surface and the second sealing surface wherein the bellows including bellow members wherein adjacent bellow walls form either inwardly open fold or outwardly open fold and wherein one or more of the bellow members extends in a direction that is oblique to the center axis of the seat.

13 Claims, 4 Drawing Sheets

(56) References Cited

U.S. PATENT DOCUMENTS

| | | | | |
|---|---|---|---|---|
| 4,290,581 | A * | 9/1981 | Moran | F16K 5/207 |
| | | | | 251/172 |
| 4,546,662 | A | 10/1985 | Tremblay | |
| 4,747,578 | A * | 5/1988 | Kivipelto | F16K 5/207 |
| | | | | 251/159 |
| 7,484,710 | B2 * | 2/2009 | Koester | F16K 5/0678 |
| | | | | 251/160 |
| 8,794,593 | B2 * | 8/2014 | Kahn | F16K 3/0227 |
| | | | | 251/328 |
| 9,593,779 | B2 * | 3/2017 | Strand | F16K 5/06 |
| 10,228,065 | B2 * | 3/2019 | Gaburri | F16K 27/067 |
| 10,371,266 | B2 * | 8/2019 | Hall | F16K 3/0227 |
| 10,400,900 | B2 * | 9/2019 | Kindersley | F16K 11/0876 |
| 2014/0319395 | A1 | 10/2014 | Warbey | |
| 2018/0038491 | A1 | 2/2018 | Gaburri et al. | |

FOREIGN PATENT DOCUMENTS

| | | | | |
|---|---|---|---|---|
| DE | 2945153 A1 * | 5/1981 | | F16K 5/201 |
| JP | 2006-017237 A | 1/2006 | | |
| WO | 2011/076992 A1 | 6/2011 | | |

OTHER PUBLICATIONS

Sep. 14, 2018 Search Report issued in International Patent Application No. PCT/FI2018/050325.

Sep. 14, 2018 Written Opinion of the International Search Report issued in International Patent Application No. PCT/FI2018/050325.

May 14, 2020 International Preliminary Report on Patentability issued in International Patent Application No. PCT/FI2018/050325.

* cited by examiner

VALVE SEALING ARRANGEMENT AND A VALVE SEAT

FIELD OF THE INVENTION

This invention relates to a valve sealing arrangement and to a valve seat.

BACKGROUND OF THE INVENTION

There is known a valve arrangement in which a valve body is provided with a flow channel, a closing member and a seat. The seat is arranged inside the valve body and against the closing member in order to provide a close-fitting connection. A typical seat type is a bellows seat.

One problem with the described valve arrangement is that during operation, the operating pressure acting on the components may displace and deform the surfaces of the components in relation to each other. Traditional metallic bellows seats are frequently not able to adjust to the displacement of the surfaces. This may lead to an uneven contact pressure distribution or even to loss of contact on the sealing surfaces that may furthermore lead to leaking of the valve.

BRIEF DESCRIPTION OF THE INVENTION

It is an object of the present invention to provide a solution, by which the valve sealing may be further improved. This object is achieved by a sealing arrangement and a valve seat as claimed in independent claims 1 and 12. The preferred embodiments of the invention are disclosed in the dependent claims.

BRIEF DESCRIPTION OF THE DRAWINGS

In the following, the present invention will be described in closer detail by way of example and with reference to attached drawings, in which.

DETAILED DESCRIPTION OF THE INVENTION

Figure 1:
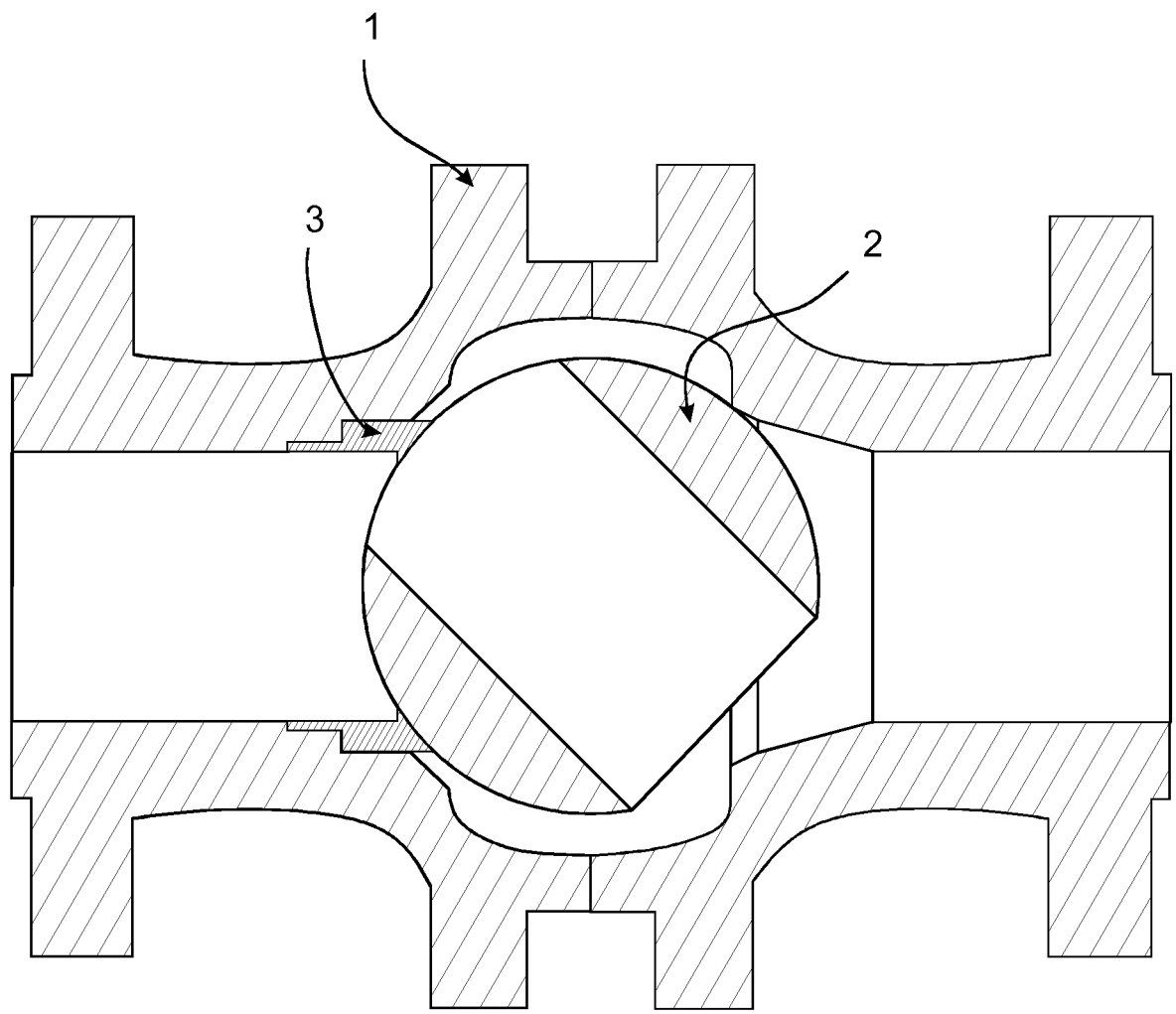
FIG. 1 shows an overall drawing of a valve arrangement.

FIG. 1 illustrates a cross-sectional, general view of a valve arrangement. The valve in FIG. 1 is, by way of example, a ball valve. FIG. 1 shows a valve body 1, a closing member 2 and a seat 3. The seat 3 is made of metal. The seat 3 is positioned such that it makes contact with both the valve body 1 and the closing member 2 in order to prevent leakage around the seat. In FIG. 1, the seat is positioned only on one side of the closing member. Alternatively, the valve arrangement may comprise seats on both sides of the closing member.

Figure 2:
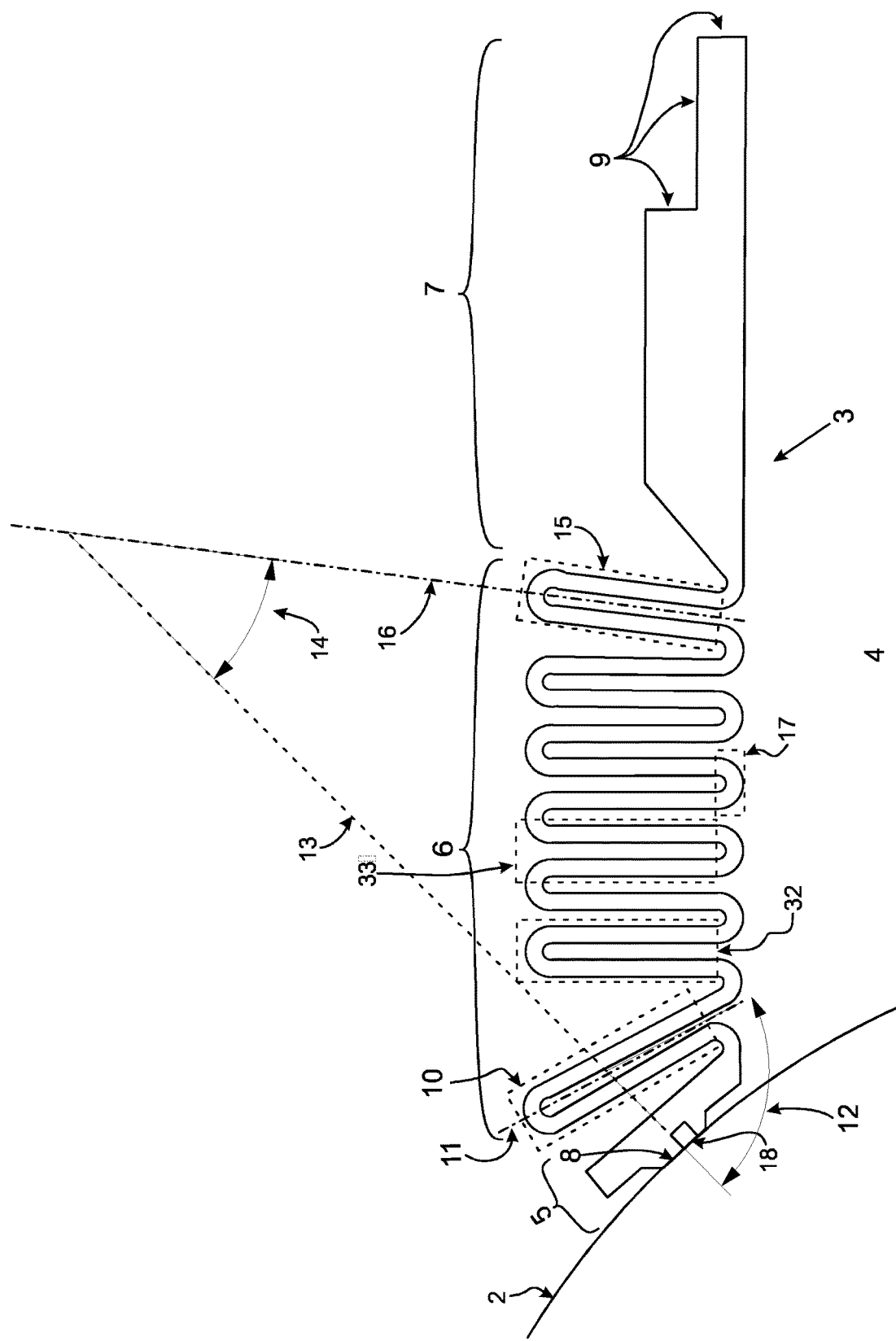
FIG. 2 illustrates a first embodiment of a valve sealing arrangement.

FIG. 2 shows a cross-sectional view of the first embodiment of the valve sealing arrangement with the seat 3 and a section of the closing member 2. The seat 3 comprises a center axis 4, a sealing portion 5 with a first sealing surface 8 for making contact with the closing member 2, and a back-sealing portion 7 with a second sealing surface 9 for making contact with the inner surface of the valve body 1.

A separate back seal, e.g. an O-ring or a graphite sealing (not shown in the Figures) may be used to provide a fluid-tight sealing between the seat and the valve body. The contact area between the sealing portion 5 and the closing member 2 is later in this text referred to as a closing member contact surface 18. Said closing member contact surface 18 may be, for instance, spherical.

The seat 3 is further provided with a bellows 6 between the first sealing surface 8 and the second sealing surface 9. The bellows 6 comprises bellow members 10 wherein adjacent bellow walls form either an inwardly open fold 32 or an outwardly open fold 33 and a series of such folds form the bellows 6. In this text, an inwardly open fold refers to a fold which is open towards the center axis 4 and an outwardly open fold refers to a fold that is open away from the center axis 4. The center axis 4 is preferably a straight line, i.e. axes of revolution of said bellow members are coaxial. In FIG. 2, the bellow members are illustrated as being of same shape, but the individual bellow members could also be of different shape or size.

In the example of FIG. 2, one or more of the bellow members 10 located closest to the first sealing surface 8 extend in a direction where the center axis 11 of said bellow member 10 forms a substantially perpendicular first angle 12 with a surface normal 13 of the closing member contact surface 18. Furthermore, a bellow member 15 located further away from the first sealing surface 18 extends in a direction which forms a second angle 14 with said surface normal 13 of the closing member contact surface 18 which second angle 14 is smaller than the first angle 12. In addition, one or more of the bellow members located furthest away from the first sealing surface 8 may extend in a direction, which is substantially parallel to the surface normal 13 of the closing member contact surface 18. It should be noted, that the surface normal 13 discussed here refers to a surface normal projecting from the middle of the closing member contact surface 18. Furthermore, in FIG. 2, the seat 3 comprises several bellow members wherein one or more of said bellow members comprises two straight sections, which are substantially parallel. In addition, one or more of the bellow members 10 extends in a direction that is oblique to the center axis 4 of said seat.

In addition to preload of the seat and load caused by heat expansion of the seat, two different pressures impose stresses to the seat during operation; one is caused by the fluid flowing in the flow channel and the other is caused by the pressurized flowing medium in a closed position of the valve. A seat comprising bellow members extending only in a direction that is perpendicular to the central axis of the seat, i.e. in a radial direction, is unnecessarily rigid in the radial direction. Such a seat is unable to adjust to the possible displacement or deformation of the closing member in the radial direction due to a pressure load in the valve. Moreover, this may result in a non-uniform contact pressure distribution on the closing member contact surface and leaking of the valve.

On the other hand, a seat comprising one or more bellow members extending in a direction that is oblique to the center axis of said seat, is much more flexible in the radial direction and such a structure is better able to adjust to the displacement and deformation of the closing member. Therefore, such a structure is advantageous as it is able to direct the spring force of the bellows such that a more uniform contact pressure distribution is formed on the closing member contact surface.

Figure 3:
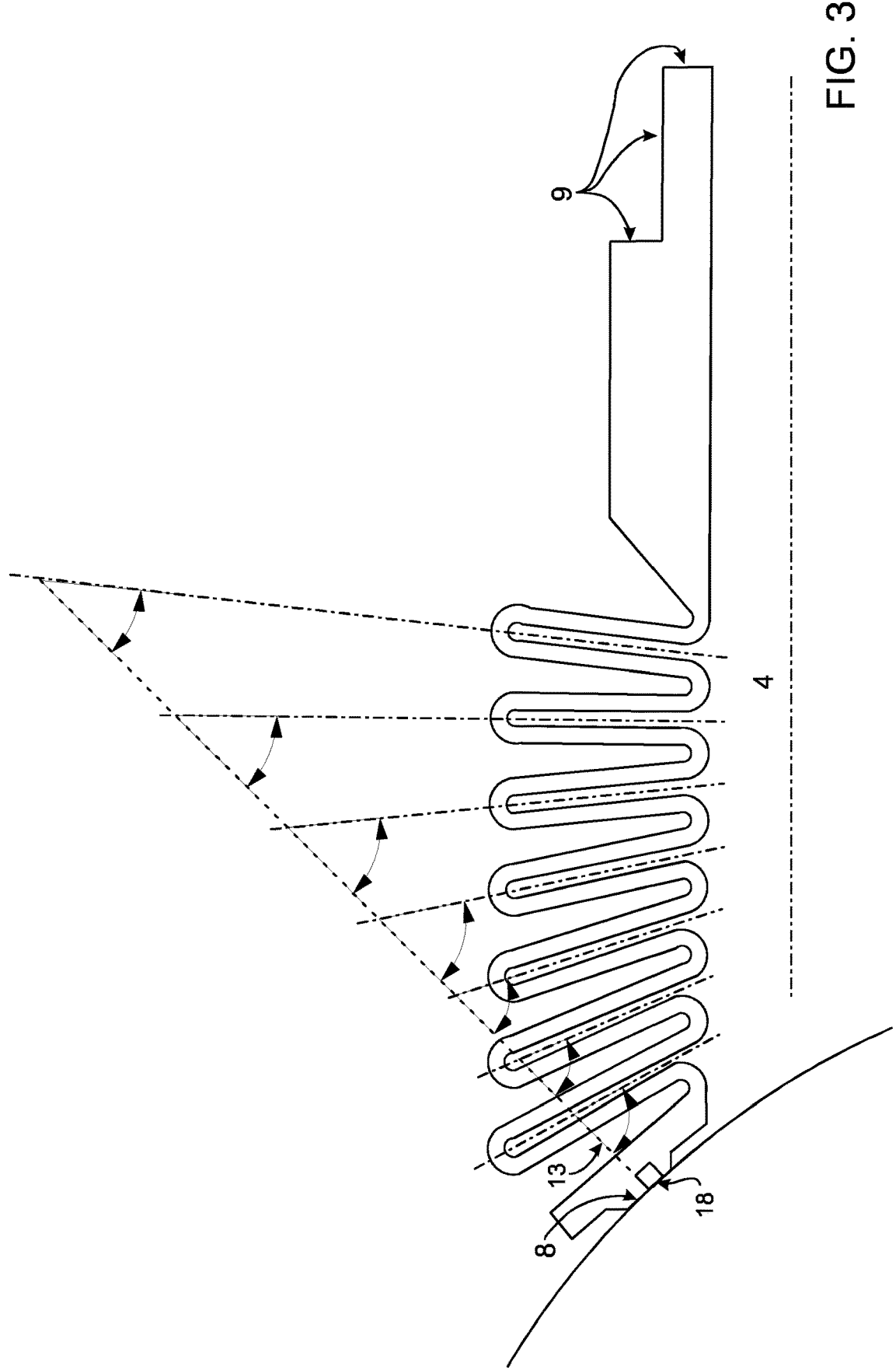
FIG. 3 illustrates a second embodiment of a valve sealing arrangement.

FIG. 3 illustrates a second embodiment of the invention, where, by way of example, the angle between the surface normal 13 of the closing member contact surface 18 and the center axes of said bellow members gradually decreases when moving away from the first sealing surface 8 towards the second sealing surface 9. Moreover, said angles decrease in such a way, that the center axes near the first sealing surface 8 form nearly perpendicular angles with said surface normal 13, and the center axes near the second sealing surface 9 may be even substantially parallel with said surface normal 13.

Figure 4:
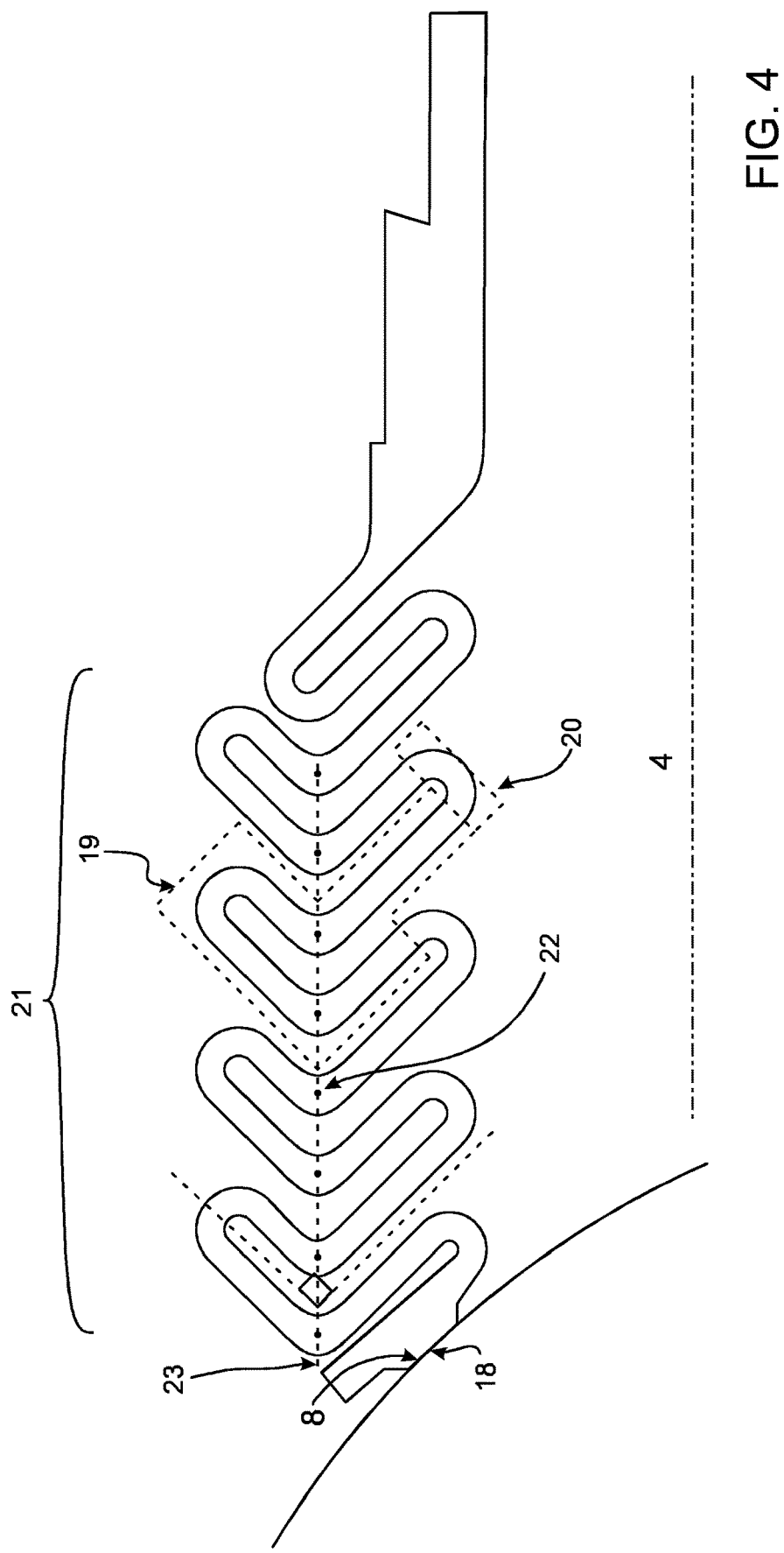
FIG. 4 illustrates a third embodiment of a valve sealing arrangement.

FIG. 4 illustrates a third embodiment of the invention wherein at least one of the bellow members is a bent bellow member. In the example of FIG. 4, the bellows comprises of several bent bellow members 19 arranged in an arrow-like formation to form a tree-like bellows structure 21 (i.e. a stacked chevron-like bellows structure). In the example of FIG. 4, a bellow member comprises two folds, or fold sections, which extend in different directions, said directions being substantially perpendicular to each other.

In FIG. 4, the arrow-like, bent bellow members are pointing towards the closing member contact surface 18. Alternatively, the arrow-like, bent bellow members may be arranged to point in the opposite direction, for instance. A tree-like bellows structure 21 is advantageous, as more material for the spring can be packed in a smaller volume. In the third embodiment illustrated in FIG. 4 only the bellow members closest to the first sealing surface and the bellow member closest to the second sealing surface extend in directions which are oblique the center axis of the seat.

In FIG. 4, the tip points 22 of the arrow-like, bent bellow members 19 are located on a same, horizontal line 23 and the lengths of said folds are approximately equal. Alternatively, the tip points 22 may be located such that they do not share a common line and lengths of the folds may vary as well. Furthermore, a bellow member may comprise more than two folds.

The seat of FIGS. 1-4 may be manufactured e.g. by means of additive manufacturing. Using additive manufacturing is beneficial, as the bellows dimensions, such as the wall thickness, may be freely varied and the bellows may be arranged in essentially any position with regard to the surface normal 13 of the first sealing surface 8, thus enabling the production of a more compact seat with an improved pressure distribution control on the sealing surfaces and enhanced durability due to more even stress distribution on the contact surfaces with the closing member and with the valve body. Additive manufacturing may be carried out by using a material containing nickel, such as a nickel superalloy and furthermore an Inconel™ alloy, furthermore an Inconel™ 625 or 718 alloy, where Inconel™ is a trademark of Huntington Alloys Corporation. Another alternative may be a stainless steel alloy, such as an AISI 316, or a titanium alloy.

In the first embodiment illustrated in FIG. 2 only the bellow members closest to the first sealing surface and the bellow member closest to the second sealing surface extend in directions which are oblique the center axis of the seat. In another example, all bellow members extend in directions, which are oblique to the center axis of the seat. In yet another example, the bellows comprises bellow members wherein all bellow members extend in substantially parallel directions.

In FIGS. 2-5 of the present invention, the bellow members are connected with curved connecting portions 17, 22. Using curved connecting portions is beneficial as increasing corner radii reduces locations of stress concentration. However, it should be noted, that this is only one example of how the bellow members may be connected, and another alternative involves using e.g. connecting portions with sharp corners.

It is to be understood that the above description and the related figures are only intended to illustrate the present invention. It will be obvious to a person skilled in the art that the invention may also be varied and modified in other ways without departing from the scope of the invention.

The invention claimed is:

1. A valve sealing arrangement, comprising:
   a valve body, and
   a closing member comprising a closing member contact surface, and
   a seat, having a center axis, and provided with a sealing portion with a first sealing surface for making contact with the closing member and a back sealing portion with a second sealing surface for making contact with a surface of the valve body, wherein
   the seat is further provided with a bellows between the first sealing surface and the second sealing surface wherein the bellows comprises bellow members wherein adjacent bellow walls form either inwardly open fold or outwardly open fold, and
   one or more of the bellow members extends in a direction that is oblique to the center axis of said seat wherein
   at least one of the bellow members is an arrow-like bent bellow member comprising two folds, or fold sections, which extend in different directions.

2. The valve sealing arrangement according to claim 1, wherein
   axes of revolution of said bellow members are coaxial.

3. The valve sealing arrangement according to claim 1, wherein
   for each bellow member at least two fold sections extend in directions which are substantially perpendicular to each other.

4. The valve sealing arrangement according to claim 1, wherein
   one or more of the bellow members located closest to the first sealing surface extend in a direction which is toward said first sealing surface.

5. The valve sealing arrangement according to claim 1, wherein
   one or more of the bellow members located closest to the first sealing surface extend in a direction which forms a substantially perpendicular first angle with a surface normal of the closing member contact surface.

6. The valve sealing arrangement according to claim 5, wherein
   a bellow member located further away from the first sealing surface extends in a direction which is away from said first sealing surface.

7. The valve sealing arrangement according to claim 5, wherein
   a bellow member located further away from the first sealing surface extends in a direction which forms a second angle with said surface normal of the closing member contact surface which is smaller than the first angle.

8. The valve sealing arrangement according to ne claim 5, wherein
   an angle between the surface normal of the closing member contact surface and the direction to which the bellow members extend, gradually decreases when moving away from the first sealing surface towards the second sealing surface.

9. The valve sealing arrangement according to claim 5, wherein one or more of the bellow members located furthest away from the first sealing surface extend in a direction which is substantially parallel to the surface normal of the closing member contact surface.

10. The valve sealing arrangement according to claim 1, wherein
the closing member contact surface is spherical.

11. A valve seat, comprising:
a sealing portion with a first sealing surface for making contact with a closing member and
a back sealing portion with a second sealing surface for making contact with a surface of a valve body, wherein
the seat is further provided with a bellows between the first sealing surface and the second sealing surface wherein the bellows comprises bellow members wherein adjacent bellow walls form either inwardly open fold or outwardly open fold, and one or more of the bellow members extends in a direction that is oblique to the center axis of said seat, wherein at least one of the bellow members is an arrow-like bent bellow member comprising two folds, or fold sections, which extend in different directions.

12. The valve seat according claim 11, wherein
each of said bellow members have an axis of revolution and
said axes of revolution are coaxial.

13. The valve seat according to claim 11, wherein the bellows comprises of several bent bellow members arranged in an arrow-like formation to form a stacked chevron-like bellows structure.

* * * * *